United States Patent

Kamath et al.

[11] Patent Number: 5,342,715
[45] Date of Patent: Aug. 30, 1994

[54] COLOR PRINTER HAVING REDUCED FIRST COPY OUT TIME AND EXTENDED PHOTORECEPTOR LIFE

[75] Inventors: Venhatesh H. Kamath; Lam F. Wong, both of Fairport, N.Y.

[73] Assignee: Xerox Corporation, Stamford, Conn.

[21] Appl. No.: 51,709

[22] Filed: Apr. 23, 1993

[51] Int. Cl.$^5$ .............................................. G03G 5/12
[52] U.S. Cl. ..................................... 430/44; 355/212; 355/327
[58] Field of Search .................. 346/160; 355/327; 430/56, 42, 44

[56] References Cited

U.S. PATENT DOCUMENTS

| | | | |
|---|---|---|---|
| 4,660,059 | 4/1987 | O'Brien | 346/157 |
| 4,833,503 | 5/1989 | Snelling | 355/259 |
| 5,040,003 | 8/1991 | Willis | 346/157 |
| 5,175,570 | 12/1992 | Haneda et al. | 346/160 |
| 5,208,633 | 5/1993 | Genovese | 355/212 |

*Primary Examiner*—John Goodrow

[57] ABSTRACT

An apparatus and method is presented for forming multiple color images on separate pitches of a photoreceptor belt and for registering the images and avoiding exposure of said images on the belt seam. In one embodiment, four LED print bars each form a color image on separate pitches of a photoreceptor belt, the images superimposed on each other to form a composite color image which is transferred to an output sheet. A photosensor is placed beneath each print bar and a belt hole formed on the belt surface a few scan lines before the start of an associated belt pitch. One of the belt holes has a dimension which is larger than the other holes and its location is sensed to provide information as to the location of the belt seam. Each belt hole, as the belt rotates, is detected by the sensor which produces a signal corresponding to detection of the trailing edge of the hole. This output signal is generated for each of the three downstream print bars and a signal is applied to each print bar to start the image exposure sequence in registration with first image exposure. The imaging operation can begin with first detection of a hole by the print bar producing the first color image. The first hole need not be the hole associated with the belt seam since the control circuitry will identify the seam sensing hole signal by the different nature of the sensor signal and will delay the exposure of the related pitch so as to ensure that the subsequent image does not overlie the seam.

7 Claims, 3 Drawing Sheets

COLOR PRINTER HAVING REDUCED FIRST COPY OUT TIME AND EXTENDED PHOTORECEPTOR LIFE

BACKGROUND OF THE INVENTION AND MATERIAL DISCLOSURE STATEMENT

The present invention relates to a color printer which forms registered plural image exposures on a photoreceptor belt by a plurality of imagers and, more particularly, to improvements in printer efficiency and belt life by use of control means associated with detection of holes formed in the belt for registration and seam sensing purposes.

In single pass electrophotographic color printers having more than one process station which provide sequential images to form a composite image, critical control of the registration of each of the sequenced images is required. Failure to achieve registration of the images yields printed copies in which the images are misaligned and unsuitable for intended uses. In a single pass, color xerographic system, in which a plurality of imaging stations are positioned adjacent to a photoreceptor surface and selectively energized to create successive image exposures, one for each of the three basic colors. A fourth imaging station is added if black images are to be created as well. Thus, each image area on the photoreceptor surface must make at least three passes relative to the transverse scan lines formed by a modulated laser beam generated by the imaging system. Each image is formed by a series of horizontal scan lines with each line having a certain number of pixels per inch. Each image must be registered to within a 0.1 mm circle or within a tolerance of ±0.05 mm. Each color image must be registered in both the photoreceptor process direction (process registration) and in the direction parallel to the process direction (referred to as the fast scan or transverse registration).

Prior art color printers have utilized, as the imaging stations, raster output scanners (ROSs) or linear image print bars, typically LED print bars. A preferred method of obtaining the requisite color image registration is to form holes in the belt in non-image areas, the hole spaced at some known distance preceding one of the pitches (image exposure frames) of the belt. Each belt pitch has an associated belt hole with some systems providing pairs of belt holes formed at opposite sides of the belt for lateral process and skew registration purposes. As the photoreceptor belt moves through the various xerographic stations, the belt holes are detected by sensors output signals are used to provide the page sync triggering signals which expose the first and successive lines formed on the associated pitch. Other signals control the lateral registration (first information pixel of each scan line). The sensed hole pairs produce signals which are used to control for skew of the belt and/or the imager.

Prior art techniques for color registration utilizing belt hole detection in an LED printer system are disclosed in U.S. Pat. No. 5,040,003 and in co-pending application U.S. Ser. No. 07/862,150 filed Apr. 2, 1992 and assigned to the same assignee as the present invention.

Techniques for color registration utilizing belt hole detection in ROS-type systems are disclosed in U.S. Pat. No. 5,175,570 and in co-pending application U.S. Ser. No. 07/807,927 filed on Apr. 2, 1992 and 07/970,889 filed on Nov. 3, 1992, both applications assigned to the same assignee as the present invention. The above identified patents and applications are hereby incorporated by reference.

A problem in the prior art color registration systems described above is that the first image can only be formed when a belt seam is first detected. As is known in the art, belts are formed by a process which leaves a seam extending across the belt width. The seam presents a discontinuity in the photoreceptor surface. In operation the photoreceptor belt is moved at a predefined velocity, and the rate of travel of the advancing copy sheet is controlled so as to regulate the exposure and transfer operations in accordance with the position of the advancing sheet. Minor variations in the speed of the belt drive motor, due, for example, to variations in the power line voltage, result in a variation of the position of latent images on the photoreceptor. These variations are cumulative in nature and must be corrected to assure that the latent images are exposed at generally the same positions on the photoreceptor each time. If not corrected, the cumulative variation would eventually cause one or more of the exposed latent image areas to encroach on the photoreceptor seam, subsequently resulting in an unacceptable copy. A number of techniques can be used to provide seam sensing. For example, notches can be formed in the belt edge at known distances from the belt seam and detected by sensors which generate outputs used for timing and control purposes. Toner registration marks can also be formed along the edge of the belt and/or interframe area and detected by light passing through the belt and falling on dedicated sensor arrays. The detected marks result in sensor signal outputs which are used to identify the location of the seam.

With any of the seam sensing techniques, the first copy out time is a function of the seam location at the start of the print operation. It could be slightly less than a full belt revolution from the seam sensor, thus maximizing the first copy out time. A second disadvantage with the prior art seam sensing is that the first pitch or two downstream from the seam detection have much greater usage than pitches further downstream, e.g. pitches 3 and 4 in a 4 pitch, A3 copy system. Thus, the photoreceptor belt life is determined mainly by the wear and stress placed on the same two pitches of the belt. It would therefore be desirable to reduce the first copy out time interval and also to provide a random pitch imaging to prolong belt life where the first pitch to be imaged is not necessarily the pitch following the seam detection.

The present invention is directed towards an improved pitch registration and seam detection circuitry in a color printer which utilizes in one embodiment a plurality of holes associated with a plurality of image exposure frames or pitches on the circumference of a photoreceptor belt. In this embodiment, one of the holes is used for both identification of the seam and as a timing hole for sensing and registering an associated downstream pitch. The hole is formed slightly different than the other pitches; in the embodiment shown, by making it 50% longer than the other pitch holes in the process or belt travel direction. The printing operation can then begin immediately with the detection of a first pitch hole which passes by the sensor associated with the first imager (not necessarily the belt hole associated with the seam). Thus, the first pitch to be imaged will also be random. This embodiment will be able to accommodate the printing of A4 (8½×11) and A3 (11×17) images as will be seen. In a second embodiment which can be used in machines dedicated to printing of A4 documents, control electronics are provided which treat each detected hole as if it were associated with a seam and provide delay such that each pitch associated with each detected hole receives a page sync signal following the same time delay. As will be explained, marks can be formed on a photoreceptor surface and used in the same way as the holes. Holes or marks are referred to generically as "targets". More particularly, the present invention relates to an electrophotographic printing machine which incorporates a photoreceptor belt which moves along a preselected path in a process direction, said belt having a seam extending across the width thereof, said color images formed in overlying registration to form a composite color image, means for forming a plurality of targets on the surface of said belt, each of said targets associated with one of said belt pitches, one of said targets having a size different from the other marks, said one of said targets further associated with identification of said seam, means for sensing said targets and for generating output signals representing detection of said targets, and control means response to said output signals for maintaining the overlying registration of said color images and for preventing said images from overlying said seam.

DETAILED DESCRIPTION OF THE INVENTION

Figure 1:
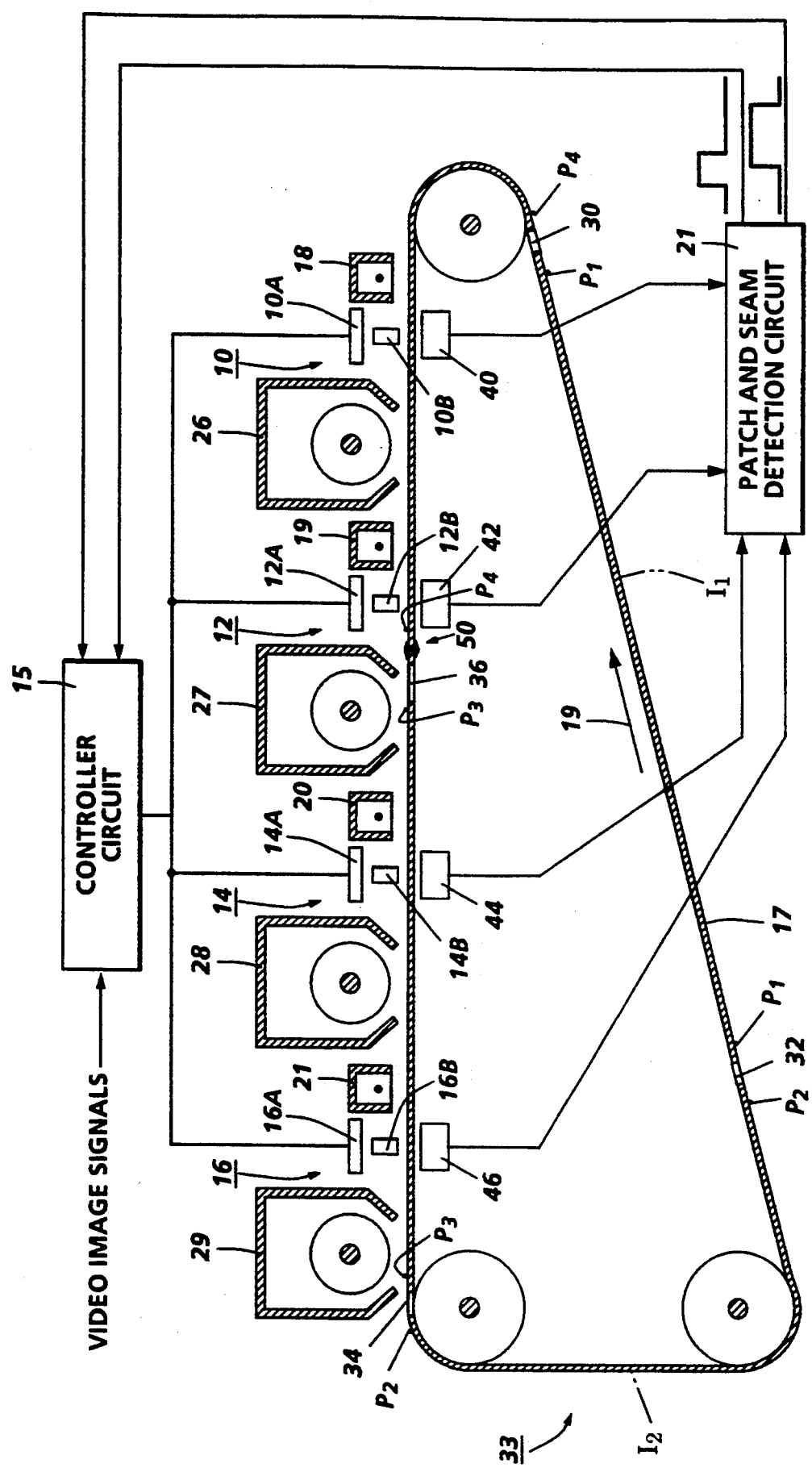
FIG. 1 is a schematic perspective view of a single pass, multiple ROS system adapted to form registered color images in accordance with the principles of the present invention.
Figure 2:
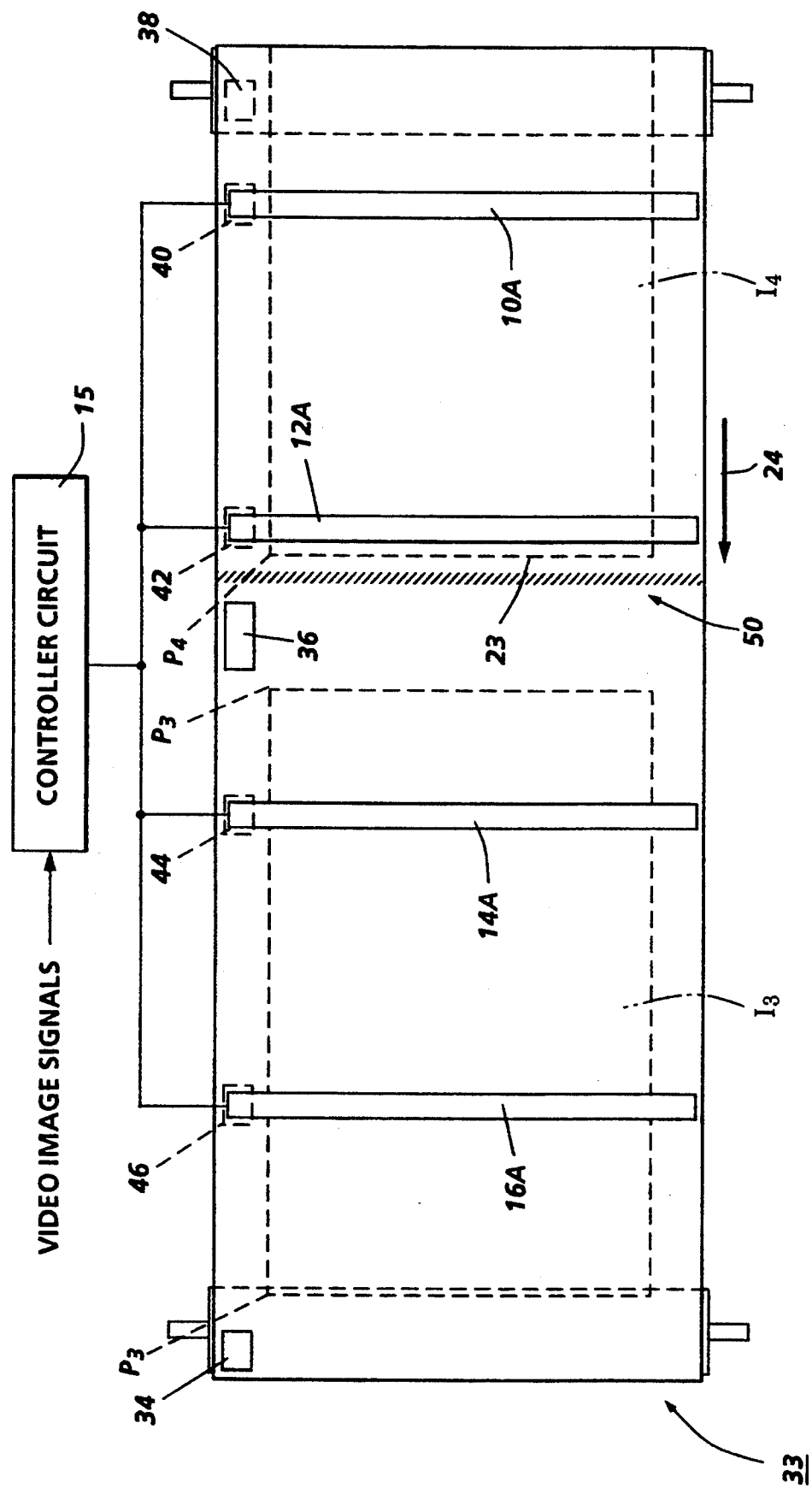
FIG. 2 is a partial top view of the belt shown in FIG. 1.

FIG. 1 shows a side view of a single pass, color printing system 8 having four exposure stations, 10, 12, 14 and 16, each station including an LED printbar 10A, 12A, 14A, and 16A. FIG. 2 shows a top view of the system of FIG. 1 absent some of the xerographic stations, for ease of description. Each printbar is selectively addressed by video image signals processed through controller circuit 15, to produce a modulated output which is coupled through a gradient index lens array 10B, 12B, 14B, 16B, onto the surface of previously charged photoreceptor belt 17. Belt 17 can accommodate an integral number of image exposure frames; for example, four A4 size exposures or two A3 size exposures during a complete revolution. In FIG. 1, four pitches are identified as $P_1$-$P_1$ (pitch $I_1$); $P_2$-$P_2$ (pitch $I_2$); $P_3$-$P_3$ (pitch $I_3$); $P_4$-$P_4$ (pitch $I_4$). Upstream of each exposure station are charge devices 18, 19, 20, 21, which place a predetermined electrical charge on the surface of belt 17. As the belt moves in the indicated direction, each image area moves past each of the printbars, with each bar providing its own exposure pattern, in response to the video data input. The exposure pattern begins when the leading edge of an image area reaches a transverse start-of-exposure line, represented by pitch $I_4$, FIG. 1, by a line 23. The exposure pattern is formed of a plurality of closely spaced transverse scan lines. Downstream from each exposure station, a development system 26, 27, 28, 29, develops a latent image of the last exposure without disturbing previously developed images. A fully developed color image is then transferred at transfer station 33, by means not shown, to an output sheet. Further details of xerographic stations in a multiple exposure single pass system are disclosed in U.S. Pat. Nos. 4,660,059 and 4,833,503, whose contents are hereby incorporated by reference.

With such a system as that disclosed in FIGS. 1 and 2, each color image $I_1$-$I_4$ must be precisely aligned (registered) so that all corresponding pixels in the image areas are registered. Current requirements call for registration tolerances of approximately 20 microns. The printbar alignment requirements are for the pixels of each bar to be aligned in the lateral (transverse) and process directions. This alignment must be maintained through continuous revolutions (passes) of the photoreceptor.

Continuing with the description of the system shown in FIGS. 1 and 2, registration holes 30, 32, 34 and 36 are formed through the belt at a position immediately preceding (upstream) an associated pitch $I_1$, $I_2$, $I_3$, $I_4$, respectively. Fixed in place beneath each of the printbars are registration sensors. Printbar 10A has associated sensor 40, printbar 12A has sensor 42, printbar 14A, sensor 44 and printbar 16A, sensor 46. The sensors are used to detect the passage of holes 30–36 coincident with the pulsing of predetermined pixels at the end of each image bar. Signals generated by each sensor are used to provide page sync and start of scan signals to enable precise energization of the associated printbar to form the leading edge scan line of each associated pitch. Co-pending application U.S. Ser. No. 07/807,931, assigned to the same assignee as the present invention, discloses LED printbar registration techniques which utilize hole sensors to generate registration correction signals, which are used to drive stepper motors, which provide incremental rotational and transverse motion to an associated image bar. The contents of this application are hereby incorporated by reference.

According to a first aspect of the present invention, one of the belt holes, for this example, hole 36, has been formed with a dimension 50% longer in the process direction than the other holes. Hole 36 is used to both identify a belt seam 50 and associated pitch $I_4$. The advantage of this arrangement will become apparent from the description of an operational sequence which follows.

It is assumed that the exposure stations 10–16 have been initially aligned so that color images are registered in the lateral and process direction and have been corrected for skew by the processes disclosed in the aforementioned prior art references. It is further assumed that a prior print operation has left the belt in the position shown in FIGS. 1 and 2. With resumption of operation, belt 17 travels in the counterclockwise (CCW) process direction indicated by arrow 19. The first pitch to be written on will be $I_1$. As the belt rotates, hole 30 will be sensed by sensor 40 and a page sync signal generated. This signal is sent to pitch and seam detection circuit 21 which identifies the signal as a "pitch only signal" and sends an appropriate corresponding output identified as a pitch detection signal to controller circuit 15. Circuit 15 then energizes printbar 10A after a predetermined delay so as to begin writing the first line of a first color image on pitch $I_1$. Pitch $I_1$ will be developed by developer 26 with the toner of a first color, recharged and re-exposed by printbar 12A after detection of hole 30 by sensor 42. The third and fourth exposures at stations 14, 16 are accomplished in the same fashion and the composite image transferred at transfer station 33 to an output sheet. It is noted at this point that operation began with detection of the first belt hole to be detected at exposure station 10, thus minimizing first copy output time. The second and third pitches are imaged in the same fashion and a composite image transferred at station 33. When belt 17 nears the end of a full revolution, belt/seam hole 36 is detected at sensor 40. The signal produced upon detection of hole 36 because of its longer process dimension has a longer pulse than that produced by detection of holes 30, 32, 34. Thus the output from pitch and seam detection circuit 21 will be along a second line and will correspond to a signal having a greater pulse time, as shown in FIG. 1. Discrimination circuitry and controller circuit 15 identifies this signal as indicating the presence of a seam. The seam is a known distance from the trailing edge of hole 36 and the first scan line of pitch $I_4$. The total distance corresponds to a time delay for the page sync signal which will be longer than that produced for the other pitch images. Except for the longer time delay for energizing each print bar, operation at each of the stations 10–14 will be the same as described above. It will be appreciated that the first pitch to be imaged is random; e.g. any of the other three pitches could have been written on to form the first image. Thus, belt usage is in a random fashion and belt life will be extended. The above operation was described in the context of a belt having four pitches to accommodate four A4 size images.

The invention can also be practiced in a system where A3 (11×17) images are formed. For this usage, the belt will be divided into two pitches and selection of the A3 mode initiated a different form of control by controller circuit 15. For this mode, hole 36 must be detected before operation can begin. Thus, in FIGS. 1 and 2, the controller circuit 15 will ignore the pitch detection signals from circuit 21 and await a pitch and seam detection signal to be generated by the circuit. A first image will then be formed on an A3 size pitch (not shown); a second image will then be formed on a second A3 size pitch which is associated with detection of belt hole 32. A two color image can be formed in a single belt revolution, while a full color will require two revolutions.

According to a second embodiment of the invention which can be practiced in an A4 imaging system, each belt hole 30–36 is formed with the same dimensions. Operations begin with the detection of the first belt hole to pass by sensor 40. The controller circuit 15 is modified so that the page sync signals to begin writing on the associated downstream pitch has a delay sufficient to prevent image overlap of seam 50. In other words, circuit 15 "assumes" that each hole detected is also associated with the seam and delays the write signal the same amount of time for each detected hole to maintain registration and also to avoid writing on the seam, should the seam happen to be associated with that hole. The advantages of reduced first copy out and random pitch imaging are preserved with this embodiment.

Figure 3:
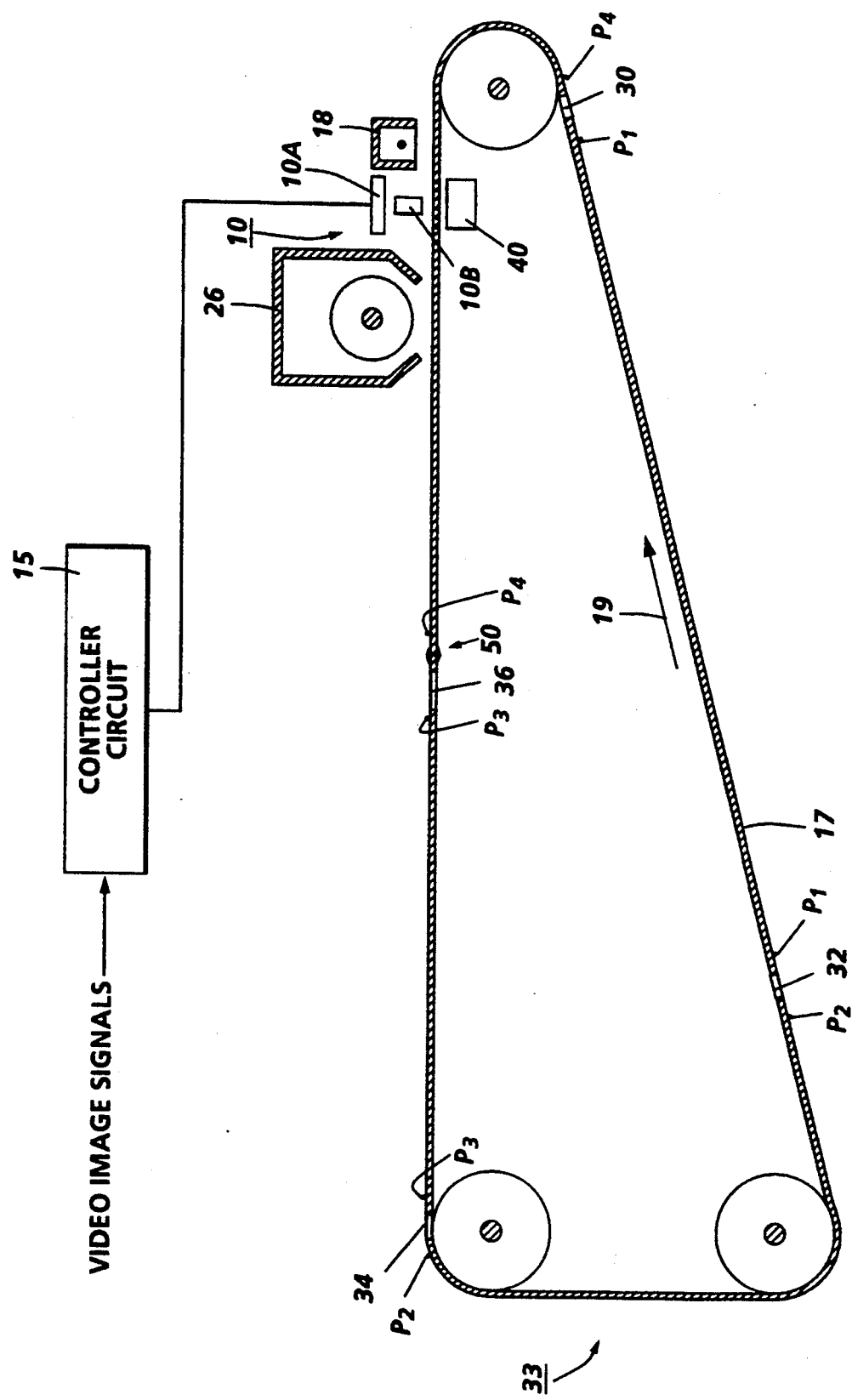
FIG. 3 is a schematic side perspective of a multiple pass version of the FIG. 1 embodiment.

While the invention has been disclosed in the context of an LED print bar imager system, it is apparent that the imagers could be ROSs or a combination of LED and ROSs. While a single pass system is disclosed, the invention is also useful in a multi-pass system where a single charge exposure and developer system is used to form a developed color image and in one pass and develop successive color images in successive belt revolutions. FIG. 3 shows the system of FIG. 1 used in a multi-pass mode with only a single imaging station 10. Operation is otherwise similar to the single pass mode; as the belt rotates, belt hole sensor 30 will be detected by sensor 40 and the first image will be formed on pitch $I_1$. The exposed image on pitch $I_1$ is developed and after a full revolution is recharged by charger 18. Belt hole 30 is again detected by sensor 40 and a second image formed and developed. Additional images are formed in the same fashion. The same advantages of minimized first copy out time and extended belt life are retained.

Further modifications may be made consistent with the principles of the invention. For example, while hole detection has been used as the registration and seam detection mechanism, marks instead of holes may be formed on the belt surface and detected by light reflected from the belt marks. Such a mark detector registration system is disclosed in co-pending application U.S. Ser. No. 08/035,830, filed Mar. 23, 1993, assigned to the same assignee as the present invention, whose contents are hereby incorporated by reference.

While the invention has been described with reference to the structures disclosed, it is not confined to the details set forth, but is intended to cover such modifications or changes as they come within the scope of the following claims.

What is claimed is:

1. An electrophotographic printing machine which incorporates a photoreceptor belt which moves along a preselected path in a process direction, said belt having a seam extending across the width thereof, said color images formed in overlying registration to form a composite color image;

means for forming a plurality of targets on the surface of said belt, each of said targets associated with one of said belt pitches, one of said targets having a size different from the other targets, said one of said targets further associated with identification of said seam, means for sensing said targets and for generating output signals representing detection of said targets, and control means response to said output signals for maintaining the overlying registration of said color images and for preventing said images from overlying said seam.

2. The printing machine of claim 1 wherein a printing operation is initiated upon sensing of any one of said targets, the pitch associated with said first detected target having the first color image formed thereon.

3. The printing machine of claim 1 wherein said targets are holes formed in the belt and wherein said sensing means comprises:

a light source opposed from one surface of the photoreceptor belt for illuminating the surface and the target line thereon, a light sensitive sensor opposed from the other surface of the photoreceptor for sensing light through said belt holes, and circuit means for producing signals which are generated at the time of detection of said belt holes.

4. The machine of claim 3 wherein said imaging means includes at least one print bar aligned adjacent to said photoreceptor and perpendicular to said preselected path, said print bar forming one of said color images during each revolution of the belt, said target being positioned a short distance upstream of the associated pitch in a plane parallel to said print bar and illuminated by said print bar.

5. The machine of claim 4 wherein said imaging means includes a plurality of print bars, each of which form a color image during a single revolution of the belt.

6. The machine of claim 1 wherein said printer includes at least a first, second and third imager, and wherein said photoreceptor is operated in a mode where two color images are formed on two belt pitches and wherein a printing operation is initiated by said first imager upon sensing one of said targets and wherein a second print bar is disabled and the second pitch is formed by said third imager.

7. In a color printer wherein a plurality of imagers are addressed by control means to form a composite color print in a single pass on a photoreceptor belt moving in a process direction and wherein said photoreceptor belt is of the type formed with a seam extending across the width thereof, said photoreceptor belt having a plurality of pitches available for forming a plurality of images during a single pass, each pitch having associated therewith a registration target for registration purposes and at least one of said targets further associated with detection of said seam and having a physical characteristic different from the other said targets, said printer further including:

detecting means associated with each image for detecting the passage of said registration targets therepast and for generating output signals representing said detection, and control means for receiving said detecting means output signals and for sending drive signals to said imagers to operate said imager so as to form images in registration with each other, said control means being further adapted to recognize the output signal generated by the detecting means detecting the passage of said target associated with the belt seam and to ensure that the image formed on the next pitch does not overlie said seam.

* * * * *